Feb. 25, 1969     G. CAMOZZO ET AL     3,429,669
METHOD OF PROCESSING NUCLEAR FUEL BY SELECTIVE ClF
FLUORINATION WITH SEPARATION OF $UF_6$ AND $PUF_4$
Filed Sept. 5, 1967
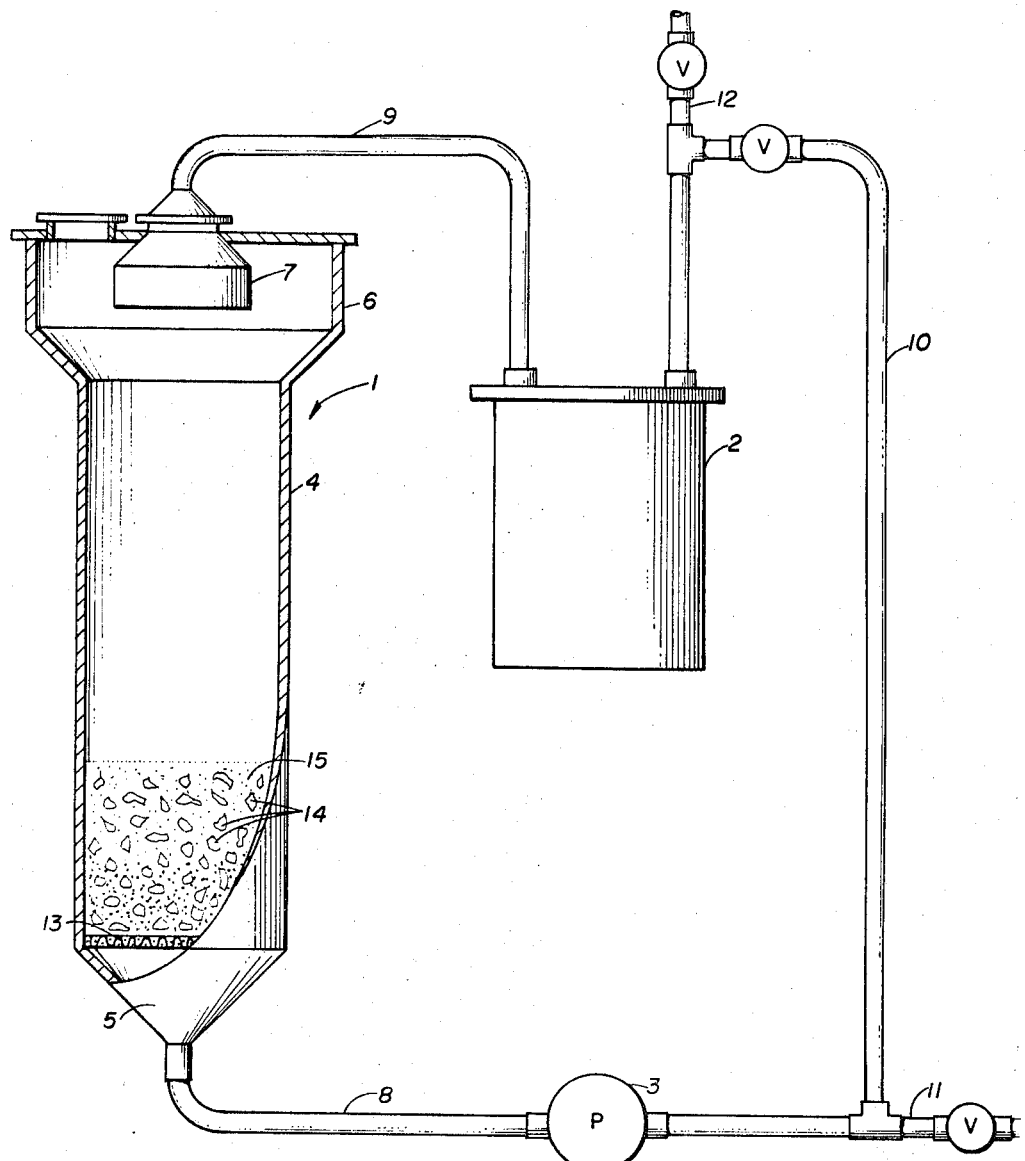
INVENTORS
GIOVANNI CAMOZZ
FRANCOIS COENE
ALDO FRANCESCON
WALTER GOOSSENS
GIANCARLO PIERIN
JEAN J SCHMETS
ADOLF STYNEN
BY
*Roland A. Anderson*
ATTORNEY

United States Patent Office 3,429,669
Patented Feb. 25, 1969

3,429,669
METHOD OF PROCESSING NUCLEAR FUEL BY SELECTIVE ClF FLUORINATION WITH SEPARATION OF $UF_6$ AND $PuF_4$
Giovanni Camozzo, Mol, Francois Coenen, Antwerp, Aldo Francesconi, Turnhout, Walter Goossens and Giancarlo Pierini, Mol, Jean J. Schmets, Mol-Donk, and Adolf Stynen, Eindhout, Belgium, assignors, by mesne assignments, to the United States of America as represented by the United States Atomic Energy Commission
Filed Sept. 5, 1967, Ser. No. 673,528
Claims priority, application Luxembourg, Sept. 6, 1966, 51,894
U.S. Cl. 23—326     13 Claims
Int. Cl. G21c *19/48;* C01g *1/00, 43/06*

ABSTRACT OF THE DISCLOSURE

Nuclear fuels are reprocessed by reacting them with chlorine monofluoride which converts the uranium in said fuels to volatile $UF_6$ and the plutonium to non-volatile $PuF_4$. The chlorine produced in the reaction is separated from the $UF_6$ by distillation and reacted with fluorine to produce more chlorine monofluoride.

---

The present invention relates to a method of processing nuclear fuel which makes possible the decanning and fluorination of nuclear fuels containing uranium oxides or carbides.

In methods of this type known to date, fluorine, bromine trifluoride, bromine pentafluoride, or chlorine trifluoride is used as the fluorinating agent. But these methods call for a relatively complex plant, and they are consequently less advantageous from technical and economic points of view.

A complex plant is needed because fluorine volatilizes uranium and plutonium at the same time, forming their hexafluorides. To separate them, other techniques must be used, such as thermal decomposition of plutonium hexafluoride or selective reduction with freons or other chemical compounds.

Similarly, chlorine trifluoride only separates uranium from plutonium at low reaction temperatures, close to or below 200° C., and it is not a simple matter to maintain this low temperature owing to the heat from the fission products and the chemical reaction.

Other drawbacks to the use of $BrF_3$, $BrF_5$ and $ClF_3$ lie in the very complex operation of recycling said compounds, which is essential if an economically acceptable reagent yield is to be obtained. Uranium hexafluoride, bromine pentafluoride, bromine trifluoride and chlorine trifluoride are condensed together during the conventional uranium hexafluoride condensation operation.

Recycling of the reagent halogen fluorides thus involves prior separation of the uranium hexafluoride by fractional distillation. Another possible method consists of absorbing the uranium hexafluoride in a sodium fluoride column. While this method may be applied when chlorine trifluoride or fluorine is used as the fluorinating agent, there are some disadvantages with bromine trifluoride and pentafluoride. When these latter compounds and their reaction products, particularly bromine and uranium hexafluoride, are passed through a sodium fluoride column at 100° C., bromine is absorbed. This bromine absorption affects the purity of the uranium hexafluoride when desorbed from the sodium fluoride at 400° C.

The basic purpose of the present invention is to remedy the above mentioned drawbacks and to simplify and rationalize the nuclear fuel reprocessing plant, whatever physical form the fuel may take.

To this end, the method of the present invention comprises subjecting nuclear fuel to chlorine monofluoride so as to produce selective volatilization of the uranium in the form of its hexafluoride which is then condensed, partly at least, with the chlorine from the reaction and then separated from the latter, while the surplus chlorine monofluoride is not condensed with the uranium hexafluoride but is recycled to continue its reaction with the nuclear fuel.

The use of chlorine monofluoride gives very clean separation of the uranium and plutonium, since the former is transformed into volatile uranium hexafluoride and the latter is transformed into solid plutonium tetrafluoride at any reaction temperature below 700° C.

The use of chlorine monofluoride makes it possible to recycle the surplus chlorine monofluoride and consequently to improve the chemical fluorine yield and to simplify and rationalize the reprocessing plant.

In accordance with one advantageous application of the subject invention, the method is applied to compact nuclear fuel.

In an especially advantageous application of the subject invention, the fuel is subjected to chemical pulverization beforehand.

In accordance with a recommended application of the subject invention, the method comprises processing the nuclear fuel at a temperature between 50 and 700° C. In the event the fuel is compact, a favorable reaction temperature for obtaining an industrially satisfactory yield is of the order of 500° C. When the fuel from the nuclear reactor is in powder form, or has been subjected to prior pulveriation with other reagents before being fluorinated, 50° C. is quite adequate for the reaction to proceed.

In another application of the method of this invention, an oxidizing agent such as oxygen is added to the ClF. This is of particular interest when it is necessary to process fuel canned, for instance, with stainless steel, for the addition of oxygen permits, in a single step, complete fuel decanning and fluorination and substantial separation of the main constituents of the fuel, such as uranium and plutonium. Moreover, the addition of oxygen appreciably increases the rate of attack on compact fuel in comparison to ClF used alone.

Further details and features of the invention will be seen from the description given below, purely as an example, of several special applications of the method of the invention with reference to the appended drawing.

The figure is a diagram of a fluorination plant for the implementation of the method of the invention.

The plant comprises a reactor 1, a condenser 2 and a recycling pump 3.

The reactor 1 consists basically of a vertical column 4 intercalated between a funnel-shaped lower part 5 and a widened upper part 6 in which there is a filter 7. The lower part 5 of the reactor 1 is connected to the outlet of recycling pump 3 by duct 8, while filter 7 is connected to condenser 2 by an outlet duct 9. A recycling duct 10 connects the condenser 2 by an outlet duct 9. A recycling duct 10 connects the condenser 2 to the inlet to pump 3. Lastly, a reaction gas supply duct 11 is connected to duct 10, while duct 12 enables the products of the reaction, consisting chiefly of chlorine and uranium hexafluoride, to be recovered.

A grid 13 separates the column 4 from the lower part 5 of the reactor 1 and separates the nuclear fuel 14 which may consist of pellets immersed in a fluidized bed of pulverulent inert material 15 such as calcium fluoride, magnesium fluoride or alumina. This pulverulent material fills the gaps between the pellets and promotes heat transfer.

For carrying out the method of the invention with the plant described, pure or diluted chlorine monofluoride, possibly mixed with pure or diluted oxygen, is introduced into duct 11 and sent to the lower part 5 of the reactor 1 through pump 3 and duct 8. The above mentioned gas flow fluidizes pulverulent material 15, while the reagent gases react with the fuel 14. During the reaction, in the event the fuel consists of oxides, oxygen and chlorine are formed as reaction by-products. These by-products do not hamper the progress of the reaction, for the reaction gases pass successively through filter 7 and duct 9 and enter condenser 2. Here the chlorine is almost entirely condensed with the uranium hexafluoride produced; the condensed uranium hexafluoride and chlorine are discharged through duct 12 and later separated by distillation. Distillation, moreover, is always applied when high decontamination of the uranium hexafluoride is desired. The oxygen is recycled with the surplus chlorine monofluoride through duct 10. The chlorine separated by distillation may be reacted with fluorine, in an ancillary reactor not shown in the figure, to obtain chlorine monofluoride which is used as the reagent for the fluorination reaction.

In the event the fuel consists of carbides, fluorinated carbon derivatives are formed. These may also be recycled or, failing that, distilled.

The reaction gases fed into the reactor 1 are kept at more than 50° C., while the condenser 2 is cooled to around −50° C. The chlorine monofluoride and where applicable the oxygen and/or the diluent gas do not condense at this temperature and are consequently recycled in the reactor 1 after the addition of chlorine monofluoride and/or oxygen to maintain adequate concentration and total flow.

When the uranium is completely volatized the plutonium, which is left as the solid reaction residue, is volatilized in its turn with a suitable fluorinating agent, such as fluorine, by methods described in prior publications.

Some examples of the method of the invention are given below.

Example 1

250 g. of a mixture of uranyl fluoride and uranium tetrafluoride in a 2:1 ratio and diluted with 250 g. of alumina was processed at 300° C. with chlorine monofluoride with a concentration of 31% by volume in nitrogen. The surface linear rate of the gas was 6.6 cm./sec. at 25° C. and 1 atm. The mean volatilization rate of the fuel was 0.82 kg. of uranium hexafluoride per h. dm.$^2$ during the first forty minutes' reaction.

Example 2

250 g. of a mixture of uranyl fluoride and uranium tetrafluoride in a 2:1 ratio and diluted with 250 g. of alumina was processed at 200° C. with chlorine monofluoride with a concentration of 28% by volume in nitrogen. The surface linear rate of the gas was 6.6 cm./sec. at 25° C. and 1 atm. The mean volatilization rate of the fuel mixture was 0.59 kg. of uranium hexafluoride per h. dm.$^2$ during the first ninety minutes' reaction.

Example 3

250 g. of a mixture of uranyl fluoride and uranium tetrafluoride in a 2:1 ratio and diluted with 250 g. of alumina was processed at 500° C. with chlorine monofluoride with a concentration of 25% by volume in nitrogen. The surface linear rate of the gas was 6.0 cm./sec. at 25° C. and 1 atm. The mean volatilization rate of the fuel mixture was 0.72 kg. of uranium hexafluoride per h. dm.$^2$ during the first seventy-seven minutes' reaction.

Example 4

250 g. of compact uranium dioxide was processed at 550° C. with chlorine monofluoride diluted in nitrogen. The concentration of chlorine monofluoride was 50% by volume and the surface linear rate of the gas was 2 cm./sec. at 25° C. and 1 atm. The mean volatilization rate for the transformation of uranium dioxide into uranium hexafluoride was 0.31 kg. of uranium hexafluoride per h. dm.$^2$ during the first ninety-two minutes' reaction.

Example 5

A powder consisting of 500 mg. of uranium tetrafluoride and 500 mg. of plutonium tetrafluoride was processed for 5 hours at 400° C. with chlorine monofluoride with a concentration of 30% by volume in argon. The linear rate of the mixture of argon and chlorine monofluoride was 0.615 cm./sec. at 20° C. and 1 atm. The quantity of plutonium volatilized was 0.0%, while 99.9% of the uranium was volatilized as uranium hexafluoride.

Example 6

A 2.6 g. pellet consisting of 10% $PuO_2$ by weight and 90% $UO_2$ by weight in a stainless steel can was processed for several hours at 550° C. with a mixture of chlorine monofluoride and oxygen in concentrations of 40% and 60% respectively. The linear rate of the gas mixture was 0.615 cm./sec. at 20° C. and 1 atm. The can was completely destroyed and the quantity of Pu volatilized was 0%, while 99% of the uranium was volatilized.

The experiments described in the first three examples were effected in a fluidized bed, whereas the fluidization rate was not reached for the experiment in the fourth example. Examples 5 and 6 were carried out in a conventional horizontal furnace.

This invention, as can be seen, relates to the reprocessing of many types of uranium fuels, canned or uncanned. This invention is particularly useful in the reprocessing of metallic uranium, uranium dioxide, uranium tetrafluoride, and uranium carbide fuels, all of which contain plutonium after irradiation in a nuclear reactor. The examples above show that reaction of such fuels with chlorine monofluoride results in the formation of volatile $UF_6$ with no formation of volatile $PuF_6$. Chlorine monofluoride is uniquely efficacious in selectively fluorinating uranium to volatile $UF_6$ and plutonium to nonvolatile $PuF_4$ so that plutonium may be readily separated from uranium.

The method of this invention thus has the advantage over known methods of this type of enabling uranium and plutonium to be separated in a simplified plant and of being applicable to all physical and chemical forms of nuclear fuel, whether canned or not. With canned fuel, the can enclosing the actual fuel was completely destroyed through the combined action of oxygen and chlorine monofluoride on the can. By analysis of a stainless steel can after attack by a mixture comprising oxygen and chlorine monofluoride, iron fluorides were found to have formed. Using this simplified plant the capital and running costs for the method are consequently low in relation to existing methods.

It is clear that the invention is by no means restricted to the applications described, and that many variants may be found without going outside the framework of the present patent. The method of the invention may furthermore be used solely to decan nuclear fuel; the decanning may then be followed by any operation. Nuclear fuel subassemblies may also be decanned by this method.

We claim:
1. A method of separating uranium and plutonium in reprocessing nuclear fuels, comprising the steps of:
  (a) reacting said nuclear fuels with a reagent containing chlorine monofluoride to selectively produce volatile uranium hexafluoride and nonvolatile plutonium tetrafluoride;
  (b) condensing said volatile uranium hexafluoride with chlorine released from said reaction to allow recycling of the unreacted chlorine monofluoride; and
  (c) separating said uranium hexafluoride from said chlorine.

2. A method as recited in claim 1, wherein said nuclear fuel is compact nuclear fuel.

3. A method as recited in claim 1, wherein said nuclear fuel is subjected to chemical pulverization before reprocessing.

4. A method as recited in claim 1, wherein said step of reacting said nuclear fuel with said reagent containing said chlorine monofluoride is carried out at a temperature between 50 and 700° C.

5. A method as recited in claim 1, wherein said step of reacting said nuclear fuel with said reagent containing said chlorine monofluoride is carried out at a temperature between 200 and 600° C.

6. A method as recited in claim 1, wherein said nuclear fuel is mixed with a fluidized inert pulverulent material.

7. A method as recited in claim 1, wherein said reagent containing said chlorine monofluoride contains an oxidizing agent.

8. A method as recited in claim 7 wherein said oxidizing agent is oxygen.

9. A method as recited in claim 7 wherein said reagent containing said chlorine monofluoride and said oxidizing agent is diluted with an inert gas.

10. A method as recited in claim 8, wherein the ratio of oxygen to chlorine monofluoride concentrations is less than 10.0.

11. A method as recited in claim 1, wherein said step of condensing said uranium hexafluoride with said chlorine is effected at a temperature between the boiling points of chlorine monofluoride and chlorine.

12. A method as recited in claim 1 wherein said step of separating said uranium hexafluoride from said chlorine includes:
(a) distilling said uranium hexafluoride from said chlorine; and
(b) reacting said chlorine with fluorine to produce chlorine monofluoride.

13. A method as recited in claim 1 wherein said reagent containing chlorine monofluoride is diluted with an inert gas.

References Cited

UNITED STATES PATENTS

| | | | |
|---|---|---|---|
| 2,811,413 | 10/1957 | McMillan | 23—352 |
| 3,294,493 | 12/1966 | Jonke et al. | 23—326 |
| 3,303,004 | 2/1967 | Bennett et al. | 23—352 |

OTHER REFERENCES

Schmets, J., Camozzo, G., Heremans, R., Pierini, G., Reprocessing Mixed Oxide Fuels by Fluorination, AnL.-Trans.—478, pp. 11–18, Mar. 17, 1967.

CARL D. QUARFORTH, *Primary Examiner.*

M. J. McGREAL, *Assistant Examiner.*

U.S. Cl. X.R.

23—324, 352, 344